United States Patent [19]

Kanaya et al.

[11] Patent Number: 5,264,676
[45] Date of Patent: Nov. 23, 1993

[54] ELECTRIC DISCHARGE MACHINING APPARATUS WITH A VERTICALLY MOVABLE TANK

[75] Inventors: Takashi Kanaya; Toshiya Nagata, both of Nagoya, Japan

[73] Assignee: Mitsubishi Denki K.K., Tokyo, Japan

[21] Appl. No.: 987,796

[22] Filed: Dec. 9, 1992

[30] Foreign Application Priority Data

Dec. 10, 1991 [JP]   Japan .................................. 3-325717

[51] Int. Cl.⁵ ............................................... B23H 1/00
[52] U.S. Cl. ................................................. 219/69.11
[58] Field of Search .......................... 219/69.11, 69.14; 204/224 M

[56] References Cited

U.S. PATENT DOCUMENTS 4,808,787  2/1989  Futamura .......................... 219/69.14

FOREIGN PATENT DOCUMENTS

3824006  1/1990  Fed. Rep. of Germany ... 219/69.11
2-48113   2/1990  Japan ................................. 219/69.11
4164515   6/1992  Japan ................................. 219/69.11
665376    5/1988  Switzerland ...................... 219/69.14

Primary Examiner—Geoffrey S. Evans
Attorney, Agent, or Firm—Sughrue, Mion, Zinn, Macpeak & Seas

[57] ABSTRACT

In an electric discharge machining apparatus, a vertically movable processing tank is provided for reserving therein a processing liquid. The processing tank is variable in a vertical direction. A link mechanism is used as a unit for vertically moving the processing tank. A processing-tank vertically-moving arrangement has an air cylinder for retaining the processing tank through an entire stoke of the processing tank moving vertically and a spring operative through the entire stroke and having a retaining force which varies depending upon a position of the stroke without the necessity of control from the outside. In a second embodiment a cylindrical bellows element is used to seal a table on which the workpiece is mounted to the tank.

43 Claims, 10 Drawing Sheets

PRIOR ART

FIG. 9

PRIOR ART

FIG. 10

PRIOR ART

FIG. 11

PRIOR ART

FIG. 12

PRIOR ART

FIG.13

PRIOR ART

FIG. 14

ELECTRIC DISCHARGE MACHINING APPARATUS WITH A VERTICALLY MOVABLE TANK

FIELD OF THE INVENTION

The present invention relates to an electric discharge machining apparatus which comprises a vertically-movable processing tank for storing or reserving therein a processing liquid such that the processing tank is variable in a vertical height.

BACKGROUND OF THE INVENTION

Figure 9:
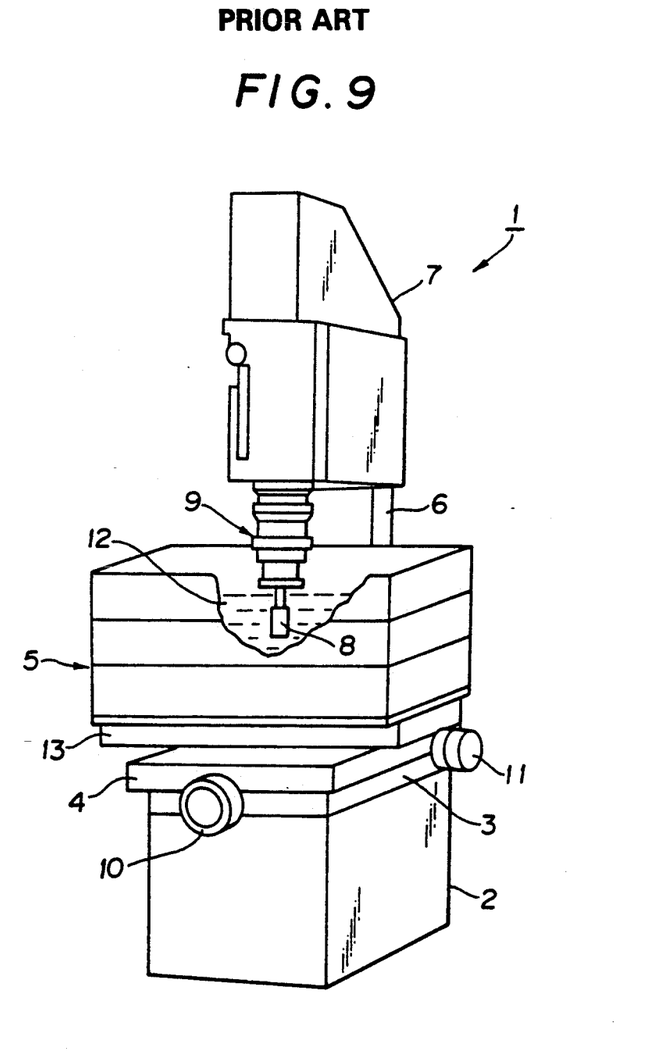
FIG. 9 is a perspective view showing a schematic arrangement of a general electric discharge machining apparatus.

FIG. 9 of the attached drawings is a schematic perspective view of an electric discharge machining apparatus having a C-shaped configuration in side elevational view. In this conventional example, the electric discharge machining apparatus is a die-sinking electric discharge machining apparatus. The electric discharge machining apparatus 1 comprises a bed 2, and a saddle 3 and a table 4 which are mounted on the bed 2. A processing tank 5 is mounted on the table 4. A head 7 is mounted on a column 6 which extends from the bed 2. A processing electrode 8 is fixedly mounted on the head 7 through an electrode-mounting stool 9. Further, the reference numeral 10 denotes a Y-axis driving motor; 11, an X-axis driving motor; 12, a processing liquid reserved within the processing tank 5; 13, a table stool on which a workpiece (not shown) is fixedly mounted and which is a plate-like element generally.

Figure 10:
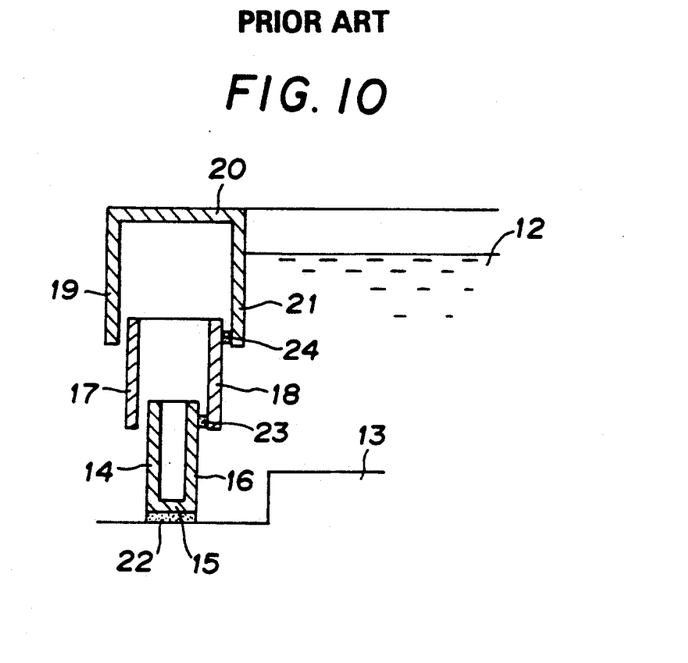
FIG. 10 is a fragmentary cross-sectional view showing a processing tank of a conventional electric discharge machining apparatus.

FIG. 10 is a partially schematic cross-sectional view of the conventional processing tank 5 which is disclosed in, for example, Japanese Patent Laid-Open No. HEI 2-48113. Of the processing tanks 5 which are movable vertically in a telescopic manner, FIG. 10 shows an example in which the processing tank 5 is movable vertically in a three-step or three-stage manner. The reference numerals 14, 15 and 16 denote an outer wall, a bottom wall and an inner wall of a first stage in the processing tank 5, respectively; 17 and 18, an outer wall and an inner wall of a second stage in the processing tank 5, respectively; and 19, 20 and 21, an outer wall, an upper surface and an inner wall of a third stage in the processing tank 5, respectively.

Further, the reference numeral 22 denotes a seal element arranged between the table stool 13 and the bottom surface 15 of the first stage in the processing tank 5; 23, a seal element arranged between the inner wall 16 of the first stage in the processing tank 5 and the inner wall 18 of the second stage in the processing tank 5; and 24, a seal element arranged between the inner wall 18 of the second stage in the processing tank 5 and the inner wall 21 of the third stage in the processing tank 5. The bottom surface 15 of the first stage in the processing tank 5 forms a bottom surface of the entire processing tank 5, while the upper surface 20 of the third stage in the processing tank 5 forms an upper surface of the entire processing tank 5.

Figure 11:
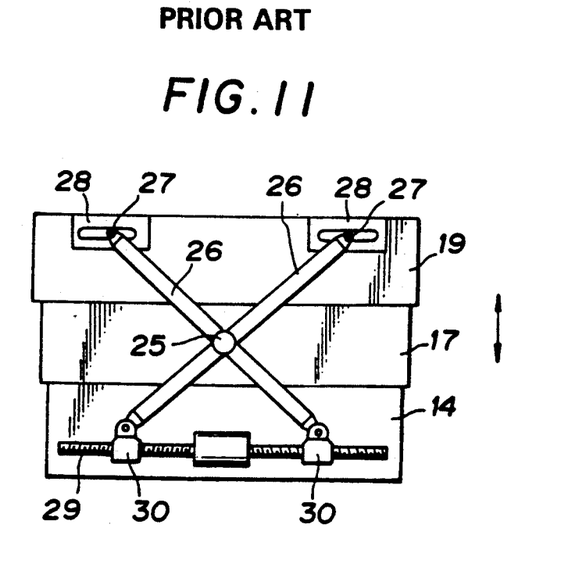
FIG. 11 is a view for explanation showing a processing-tank vertically-moving unit in the conventional electric discharge machining apparatus.

FIG. 11 is a schematic side elevational view showing a processing-tank vertically-moving unit of the conventional electric discharge machining apparatus, and shows the processing tank 5 as viewed from the left-hand side in FIG. 10. A support shaft 25 is fixedly mounted on the outer wall 17 of the second stage in the processing tank 5. A pair of arms 26 supported by the support shaft 25 and a pair of guide elements 28 having respective guide grooves in guide pins 27 mounted respectively on forward ends of the arms 26 are mounted on the outer wall 19 of the third stage in the processing tank 5. A ball screw 29 and a pair of nuts 30 are mounted on the outer wall 14 of the first stage in the processing tank 5, and holds or retains the arms 26.

Operation will next be described. As shown in FIG. 9, the saddle 3 moves on the bed 2 in a Y-axis direction by the Y-axis driving motor 10. The table 4 moves on the saddle 3 in an X-axis direction by the X-axis driving motor 11. The electrode-mounting stool 9 moves in a Z-axis direction by a Z-axis driving motor (not shown) within the head 7. Accordingly, the workpiece (not shown) mounted on the table stool 13 can move in the X- and Y-directions, while the processing electrode 8 mounted on the electrode-mounting stool 9 can move in the Z-axis direction. The processing liquid 12 is reserved within the processing tank 5, and electrode discharge processing is executed at a location between the processing electrode 8 and the workpiece through the processing liquid 12.

As shown in FIG. 10, the outer wall 14, the bottom surface 15 and the inner wall 16 of the first stage in the processing tank 5 are fixedly mounted on the table stool 13 through the seal element 22, so that the outer wall 14, the bottom surface 15 and the inner wall 16 do not move vertically. On the other hand, the outer wall 17 and the inner wall 18 of the second stage in the processing tank 5 move vertically by a processing-tank drive unit illustrated in FIG. 11, in integral relation to each other. Further, the outer wall 19, the upper surface 20 and the inner wall 21 of the third stage in the processing tank 5 similarly move vertically. Accordingly, it is possible to optionally vary a vertical height of the entire processing tank 5.

As shown in FIG. 11, a so-called "link mechanism" is formed by the support shaft 25, the arms 26, the guide pins 27, the guide elements 28, the ball screw 29 and the nuts 30, thereby forming the processing-tank vertically-moving unit. The ball screw 29 mounted on the outer wall 14 of the first stage in the processing tank 5, which is not moved vertically, is rotated by a processing-tank vertically-moving motor (not shown), and the nuts 30 move in their respective directions different from each other, whereby the arms 26 held respectively by the nuts 30 are open and closed. As a result, the support shaft 25, that is, the outer wall 17 of the second stage in the processing tank 5 and the outer wall 19 of the third stage in the processing tank 5 move vertically, making it possible to optionally vary the vertical height of the entire processing tank 5.

Furthermore, as shown in FIG. 10, the first stage and the second stage in the processing tank 5 cooperate with each other to form a sealed structure by the seal elements 23 and 24. Accordingly, if the processing liquid 12 is supplied into the processing tank 5, it is possible to reserve the processing liquid 12 in a space defined by the processing tank 5 and the table stool 13. Moreover, generally, an amount of the processing liquid 12 reserved within the processing tank 5, that is, a height of a liquid surface varies depending upon a vertical height of the processing tank 5. It is usual that program operation such as raising of the processing tank 5 to a desirable location, reservation of the processing liquid 12 within the processing tank 5 to execute discharge processing, mounting and demounting of the electrode/workpiece, and the like is executed under such a condition that the processing tank 5 is lowered.

Figure 12:
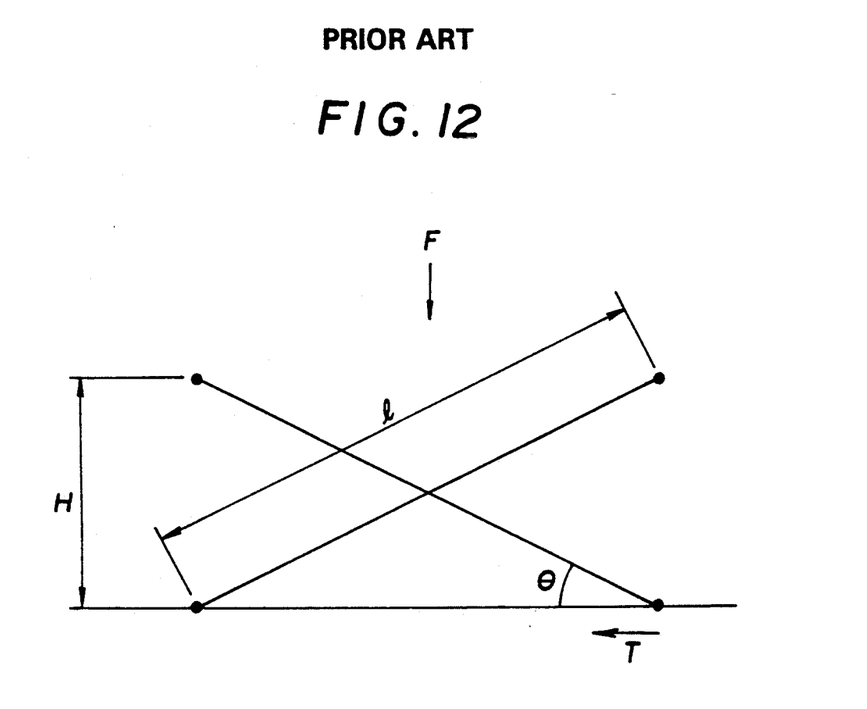
FIG. 12 is a conceptional view showing a link mechanism in the processing-tank vertically-moving unit of the conventional electric discharge machining apparatus.

FIG. 12 is a conceptional view of the link mechanism in the processing-tank vertically-moving unit illustrated in FIG. 11. In FIG. 12, the reference character F denotes a load which is vertically supported by the processing-tank vertically-moving unit, and which is equivalent to the tare or dead weight of the processing tank 5. In the normal or usual processing-tank vertically-moving unit, two sets of link mechanisms are arranged in front of and in rear of the processing tank 5, respectively, or on either side of the processing tank 5, respectively. In this case, the load F is half the tare weight of the processing tank 5. The reference character 1 denotes a length of the arm 26; $\theta$, an angle defined between the arms 26 and the horizontal line; H, a height of the processing tank 5; T, a retaining force in the horizontal direction for supporting the load F by the link mechanism. As shown in FIG. 11, the retaining force T is supported by the processing-tank vertically-moving drive unit which comprises the ball screw 29, the nuts 30 and the processing-tank vertically-moving motor (not shown). The following relationship exists among the above-described characters:

$$H = 1 \cdot \sin \theta$$

$$T = F/(2 \cdot \tan \theta)$$

Figure 13:
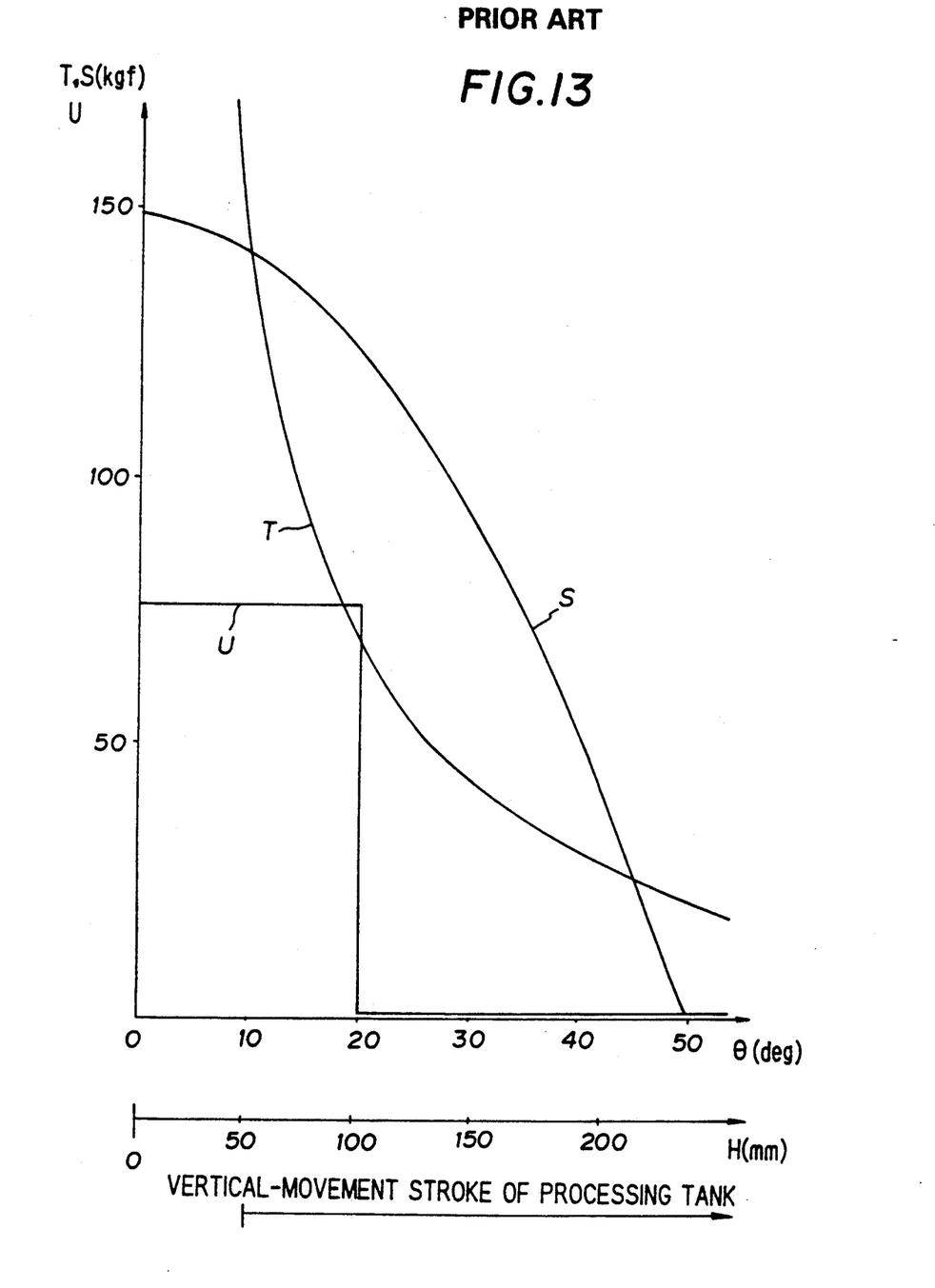
FIG. 13 is a graphical representation showing a relationship between an angle $\theta$ and a retaining force/a spring force S/a force U.

FIG. 13 is a graphical representation of the above-described relationship. The ordinate shows the retaining force T, while the abscissa shows the angle $\theta$ and the height H in combination. In this connection, the load F = 50 kgf, while the length 1 = 300 mm, as a representative example.

Figure 14:
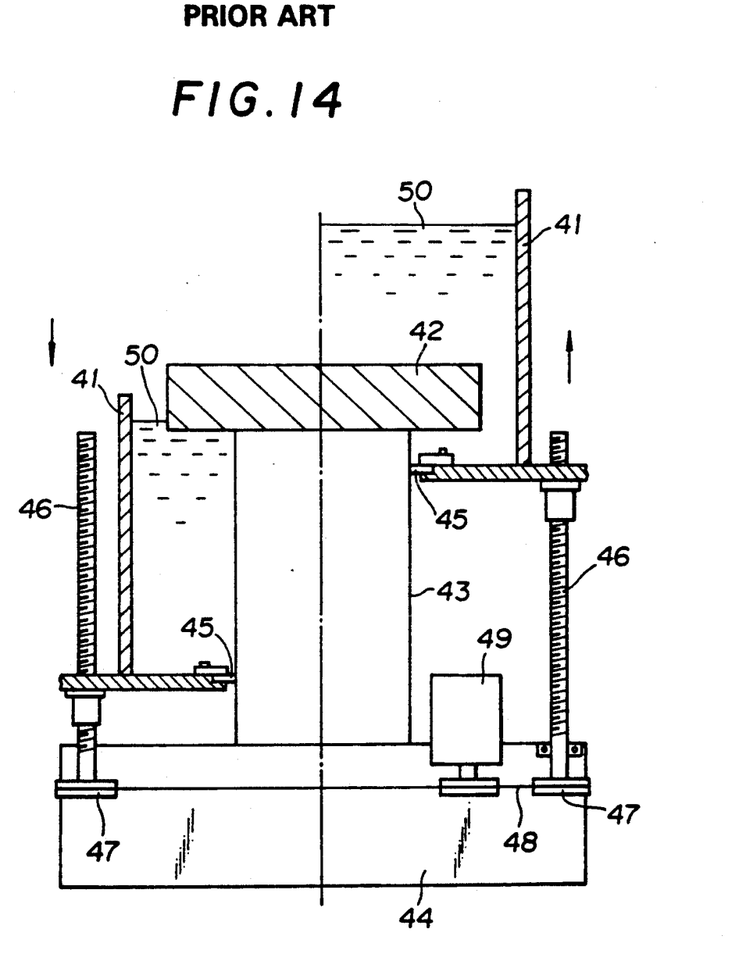
FIG. 14 is a view for explanation showing another example of arrangement of the conventional electric discharge machining apparatus.

Further, FIG. 14 is a view for explanation showing another conventional example of the electric discharge machining apparatus. As shown in FIG. 14, the reference numeral 41 denotes a processing tank for storing or reserving therein a processing liquid 50, which has a side surface and a bottom surface formed of metal sheet; 42, a table supported on a bed 44 by a support table 43; 45, a packing which seals a location between the support table 43 and the bottom surface of the processing tank 41 and which slidingly moves vertically, so that a surface of the support table 7 is processed in grinding; 46, four (4) ball screws which are mounted respectively on an outer periphery of the bottom surface of the processing tank 41; 47, four (4) sprockets which are mounted respectively on lower ends of the ball screws 46; 48, a chain mounted on the sprocket 47; and 49, a geared motor for driving the chain 48.

Operation will next be described. When the processing tank 41 is lowered to a lower limit or a lowermost position, the table 42 is exposed out of the processing liquid 50 which is reserved within the processing tank 41, as shown in the left-hand portion in FIG. 14, so that a condition is brought to one under which the workpiece can be mounted on the table 42. After the workpiece has been mounted on the table 42, the geared motor 49 starts. The chain 48 is mounted on the geared motor 49. By rotation of the sprockets 47 which are mounted on the lower end of the ball screw 46, the chain 48 runs to rotate the four ball screws 46 in synchronism with each other in this case. Since nut sections of the respective rotating ball screws 46 are mounted on the bottom surface of the processing tank 41, rotation of the ball screws 46 raises or moves upwardly the processing tank 41 as shown in the right-hand portion in FIG. 14. Four (4) locations on the bottom surface of the processing tank 41 are maintained at the same height by the four (4) ball screws 46. Also, a clearance between the packing 45, which is mounted on the bottom surface of the processing tank 41, and the support table 43, which has a surface thereof that is polished or ground, is maintained constant.

The first conventional electric discharge machining apparatus arranged as described above has the following problems. That is, the processing-tank vertically-moving unit is large-sized so that the manufacturing cost of the machine is high. Further, operability at the time the electric discharge machining apparatus is used is deteriorated.

The above-discussed problems will be described in detail with reference to FIG. 13. Specifically, according to FIG. 13, the load F which should be supported by the processing-tank vertically-moving unit is 50 kgf, whereas the retaining force T supported by the processing-tank vertically-moving drive unit is smaller than 50 kgf at the angle $\theta > 26.6$ deg. (height H > 134 mm), but is larger than 50 kgf at the angle $\theta < 26.6$ deg. (height 134 mm). For example, if it is assumed that the angle $\theta$ under a condition that the processing tank 5 is lowered to the lowest position $\theta = 10$ deg. (height $H_L = 52$ mm), the retaining force T at this time reaches $T_L = 142$ kgf. This load is approximately thrice the load F which should originally be supported by the processing-tank vertically-moving unit. Thus, the following problems arise. That is, generally, the processing-tank vertically-moving unit, which comprises the ball screw, the nut and the processing-tank vertically-moving motor, is designed on the basis of the maximum retaining force $T_L$ which should be supported. Accordingly, the processing-tank vertically-moving drive unit is large-sized. As a result, the entire processing-tank vertically-moving unit is large-sized, so that the manufacturing cost of the machine is raised.

Further, the following problems arise. That is, as the processing-tank vertically-moving unit is large-sized, the processing tank, in which the processing-tank vertically-moving unit is housed, is also large-sized. If the processing tank is large-sized, accessibility or approachability is reduced with respect to the electrode mounted on the electrode-mounting stool and the workpiece on the table stool. Operability, at the time the electric discharge machining apparatus is used, also is reduced.

Moreover, the second conventional electric discharge machining apparatus constructed as described above has the following problems. That is, in order to seal the location between the processing tank and the support table, it is necessary to grind the surface of the support table, and a relative distance between the processing tank and the support table is required to be maintained constant. Accordingly, the machine becomes very high in price or cost, and the reliability of the machine is lowered.

SUMMARY OF THE INVENTION

It is therefore a first object of the invention to provide an electric discharge machining apparatus in which a processing-tank vertically-moving unit is small-sized, the cost is low, and operability upon or at the use is improved.

It is a second object of the invention to provide an electric discharge machining apparatus in which a surface of a support table is not required to be ground, a processing tank is not required to be moved vertically so as to maintain a distance between the processing tank and the support table constant, a seal mechanism movable vertically and a vertically moving mechanism are arranged simply, the cost is low, and the reliability is high.

The processing-tank vertically-moving means according to the invention is arranged such that the link mechanism is used as the vertically-moving means for the processing tank. Also, the auxiliary drive means, such as a spring, is operative through the entire stroke but has a retaining force varying depending upon the position of the stroke without the necessity of the control from the outside. Further, the main processing-tank vertically-moving drive means retains the processing tank through out the entire vertical stroke of the processing tank, to vertically move the processing tank.

According to the invention, there is further provided an electric discharge machining apparatus comprising a processing-tank vertically-moving means arranged such that the link mechanism is used as the vertically-moving means for the processing tank. The auxiliary drive means is operative only through the part or portion of the stroke and is used to vertically move the processing tank, in addition to the processing-tank vertically-moving drive means which retains the processing tank through the entire stroke of the vertically moving processing tank.

With this arrangement of the invention, the processing-tank vertically-moving means can be small-sized, the cost is low, and operability during the use of the electric discharge machining apparatus can be improved.

According to the invention, there is provided an electric discharge machining apparatus arranged such that the processing tank has a side surface and the bottom surface, and the bottom surface of the processing tank is connected to a bottom surface of a table by an expandable and contractible bellows element in a sealed manner with respect to the electric discharge processing liquid.

According to the invention, there is further provided an electric discharge machining apparatus as described above wherein the support table has a lower portion which is connected to a bottom surface of the processing tank by the bellows element in a sealed manner with respect to the electric discharge processing liquid.

The electric discharge machining apparatus according to the invention is arranged such that the table is supported by the support table, the processing tank has a side surface and a bottom surface, and the bottom surface of the processing tank is connected to the lower portion of the support table through the expandable and contractible bellows element in a sealed manner with respect to the electric discharge processing liquid.

With the above arrangement, it is unnecessary to grind or polish a surface of the support table, and it is not required to vertically move the processing tank so as to maintain a distance between the processing tank and the support table constant. Accordingly, a seal mechanism for the vertically moving processing tank and a vertically moving mechanism therefor can be brought to simple arrangements, respectively. Thus, the cost is low, and it is possible to improve the reliability of the machine.

Preferably, the bellows element is formed into a cylindrical configuration. Further, preferably, vertical movement of the processing tank is executed by chain drive. Moreover, preferably, vertical movement of the processing tank is executed by a ball screw.

Preferably, the electric discharge machining apparatus according to the invention further comprises a control element for reducing a drive force at upward movement of the processing tank. Preferably, the control element is a spring. Further, preferably, the control element is a balance weight.

In the electric discharge machining apparatus according to the invention, the spring or the balance weight, for example, is used to reduce the driving force at upward movement of the processing tank.

Other objects and features of this invention will become understood from the following description with reference to the accompanying drawings.

DESCRIPTION OF THE EMBODIMENTS

Various embodiments of an electric discharge machining apparatus according to the invention will hereunder be described. In this connection, an arrangement of the entire electric discharge machining apparatus is the same as the conventional electric discharge machining apparatus already illustrated in FIG. 9, and the description of the same arrangement will be omitted.

Figure 1:
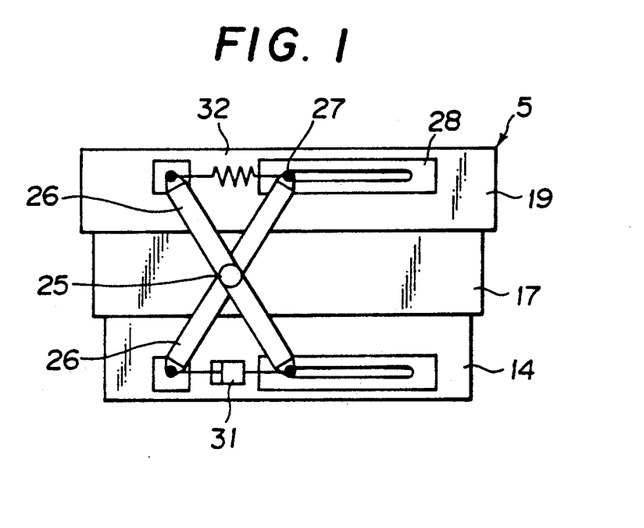
FIG. 1 is a view for explanation showing a processing tank of multiple stage type in a processing-tank vertically-moving unit of an electric discharge machining apparatus according to the invention.

Referring first to FIG. 1, there is shown a processing-tank vertically-moving unit according to the invention which comprises a multiple-stage processing tank 5 illustrated in fragmentary cross-sectional view. Here, a three-stage processing tank 5 is illustrated. In FIG. 1, the reference numeral 31 denotes an air cylinder that is a principal or main processing-tank vertically-moving drive unit, and which is connected to an air control unit (not shown); and 32, a spring serving as an auxiliary drive unit which operates over or through the entire stroke, but in which a retaining force varies depending upon a position of the stroke without the necessity of control from the outside or exterior. In this connection, the spring 32 illustrated here is a tensile spring. In FIG. 11 showing the conventional example, the main processing-tank vertically-moving drive unit comprises the ball screw 29, the nuts 30 and the processing-tank vertically-moving motor (not shown). As illustrated in FIG. 1, however, an example is shown in which the processing-tank vertically-moving unit employs the air cylinder 31. In this connection, FIG. 1 shows a condition in which the processing tank 5 rises to an uppermost position.

Figure 2:
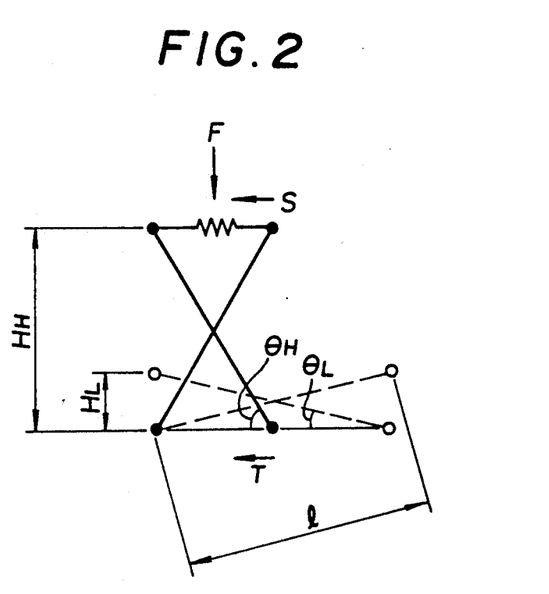
FIG. 2 is a conceptional view showing a link mechanism in the processing-tank vertically-moving unit of the electric discharge machining apparatus illustrated in FIG. 1.

FIG. 2 is a conceptional view of a link mechanism in the processing-tank vertically-moving unit illustrated in FIG. 1. In FIG. 2, the sold lines show a condition in which the processing tank 5 rises to the uppermost position, while the broken lines show a condition in which the processing tank 5 is lowered to a lowermost position. $\theta$ is an angle defined between the arm 26 and the horizontal line, while H is a height of the processing tank. Subscripts H and L show a condition in which the processing tank 5 rises to the uppermost position and a condition in which the processing tank 5 is lowered to the lowermost position, respectively.

Figure 3A:
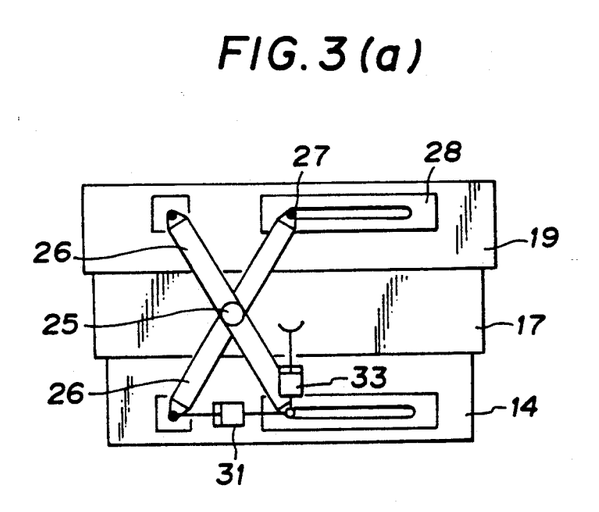
FIGS. 3(a) and 3(b) are views for explanation showing a processing tank of multiple stage type in another processing-tank vertically-moving unit of the electric discharge machining apparatus according to the invention.
Figure 3B:
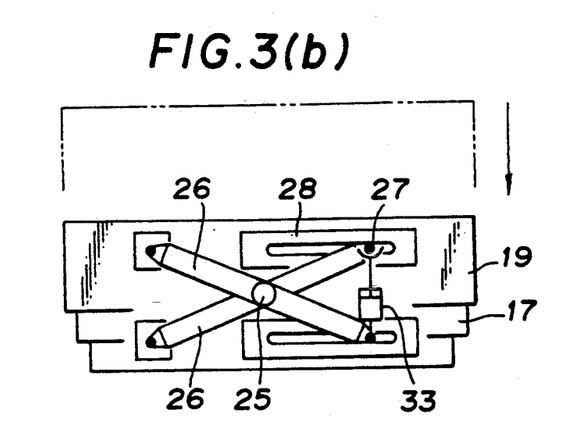

FIGS. 3(a) and 3(b) are fragmentary schematic cross-sectional views of the multiple-stage processing tank 5 in a processing-tank vertically-moving unit according to another embodiment of the electric discharge machining apparatus of the invention. FIG. 3(a) shows a condition in which the processing tank 5 rises to the uppermost position, while FIG. 3(b) shows a condition in which the processing tank 5 is lowered to the lowermost position. In FIGS. 3(a) and 3(b), the reference numeral 33 denotes an auxiliary drive unit which operates only in a portion of the stroke and which is an air cylinder in this embodiment.

Operation will next be described. As shown in FIG. 1, as the air cylinder 31 is expanded and contracted, the arms 26 are open and closed, whereby the support shaft 25, that is, the outer wall 17 of the second stage in the processing tank 5 and the outer wall 19 of the third stage in the processing tank 5 are moved vertically. Accordingly, it is possible to change or vary the vertical height of the entire processing tank 5. At this time, the spring 32 is also expanded and contracted simultaneously with opening and closing of the arms 26 so that a spring force S is generated which reduces the retaining force T supported by the processing-tank vertically-moving drive unit. It is assumed that a spring constant of the spring 32 is k, and a natural length is $l_o$. Then, the spring force S is expressed by the following equation:

$$S = k \cdot (l \cdot \cos \theta - l - l_o)$$

FIG. 13 shows a relationship between the angle $\theta$ and the spring force S. In this connection, in the above equation, the spring constant k = 1.4 kgf/mm, the length l of the arm 26 = 300 mm, and the natural length $l_o$ of the spring = 194 mm. In the processing-tank vertically-moving unit illustrated in FIG. 1, the force to be supported by the processing-tank vertically-moving unit is a difference between the retaining force T and the spring force S. In FIG. 13, a maximum value of the force is approximately 60 kgf. This is approximately 40% as compared with a conventional case where there is no spring 32. Accordingly, it is possible to reduce the size of the processing-tank vertically-moving drive unit.

Further, as shown in FIG. 3(a), when the processing tank 5 rises, the entire retaining force T is supported by the air cylinder 31 similarly to the conventional arrangement, because the auxiliary air cylinder 33 does not provide any advantage to or exert any influence upon the link mechanism. On the other hand, when the processing tank 5 is lowered as shown in FIG. 3(b), the auxiliary air cylinder 33 acts upon the link mechanism so that a force U (refer to FIG. 13) is generated. Accordingly, it is possible to reduce a burden applied to the air cylinder 31.

Here, FIG. 13 shows a supposition or assumption that the auxiliary air cylinder 33 generates the force U = 75 kgf within an area of the auxiliary air cylinder 33 in which the angle $\theta < 20$ deg. (height H < 100 mm). Similarly to the aforesaid arrangement, the force to be supported by the processing-tank vertically-moving unit is a difference between the retaining force T and the force U, and a maximum value of the force to be supported by the processing-tank vertically-moving unit is approximately 60 kgf which is approximately 40% as compared with the conventional arrangement having no auxiliary air cylinder 33. Accordingly, it is possible to reduce the size of the processing-tank vertically-moving drive unit.

Figure 4:
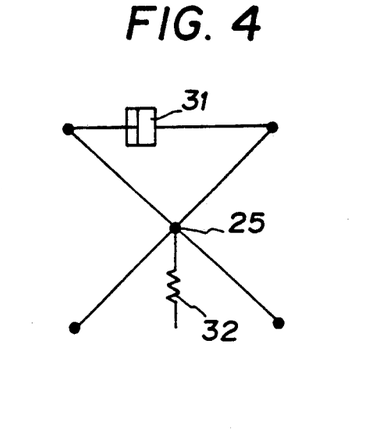
FIG. 4 is a conceptional view showing a link mechanism in another processing-tank vertically-moving unit of the electric discharge machining apparatus according to the invention.

In connection with the above, FIG. 1 shows an embodiment in which the tensile spring is used as the spring 32, and is mounted horizontally so as to help or assist the opening and closing of the arms 26. As shown in FIG. 4, however, the arrangement may be such that a compressive spring is used as the spring 32, and is mounted vertically so as to raise the support shaft 25. In this connection, the spring force S is expressed by the following equation:

$$S = k \cdot (l \cdot \sin \theta/2 - l_o)$$

Figure 5:
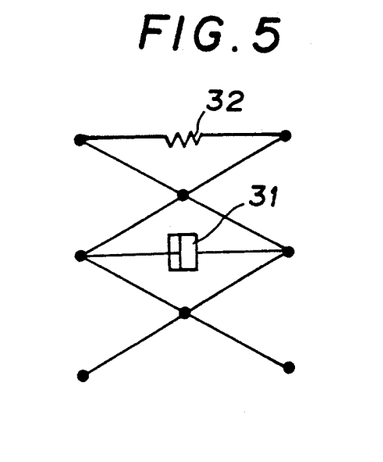
FIG. 5 is a conceptional view showing a link mechanism in another processing-tank vertically-moving unit of the electric discharge machining apparatus according to the invention.
Figure 6:
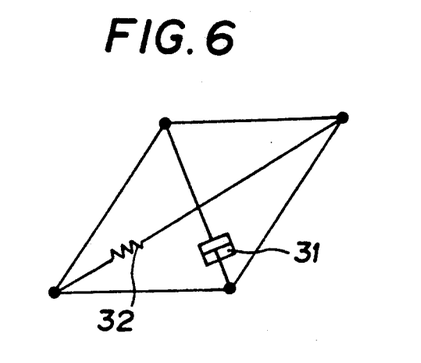
FIG. 6 is a conceptional view showing a link mechanism in another processing-tank vertically-moving unit of the electric discharge machining apparatus according to the invention.

Further, the link mechanism used as the elevating or vertically-moving mechanism for the processing tank 5 may be a two-stage link mechanism illustrated in FIG. 5, for example. Alternatively, the link mechanism may be a link mechanism arranged as a parallelogram, as illustrated in FIG. 6. The link mechanism is not particularly limited to a specific one. A mounting method of the air cylinder 31 and the spring 32 changes variously in accordance with the arrangement of the link mechanism.

Furthermore, the spring 32 serving as the auxiliary processing-tank vertically-moving unit may be one if the spring generates a force reducing the retaining force T supported by the main processing-tank vertically-moving drive unit. For example, an air cylinder may be added to the above-arrangement. The arrangement is not particularly limited to the spring.

Moreover, the main processing-tank vertically-moving drive unit is composed of the air cylinder in FIG. 1, while the processing-tank vertically-moving drive unit in the conventional arrangement is composed of the ball screw 29, the nut 30 and the processing-tank vertically-moving motor (not shown). However, the main processing-tank vertically-moving unit may be composed of a mechanism like a rack-and-pinion, for example. The main processing-tank vertically-moving unit may not particularly be limited to a specific one.

Figure 7:
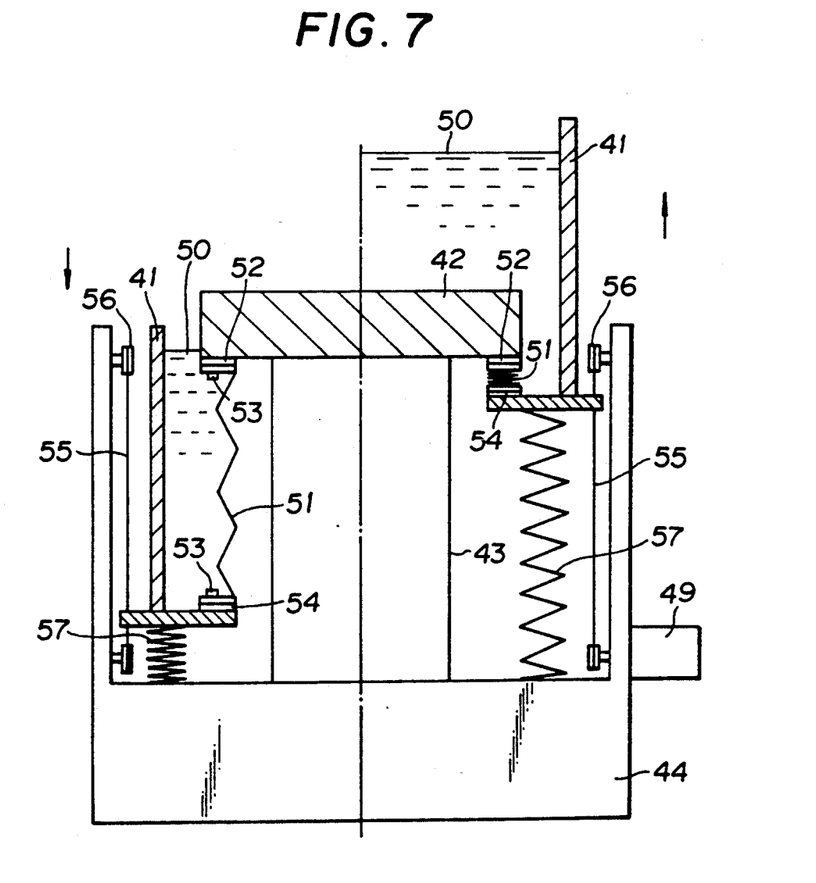
FIG. 7 is a view for explanation showing another embodiment of the electric discharge machining apparatus according to the invention.

Another embodiment of the invention will next be described with reference to FIG. 7. FIG. 7 is a view for explanation showing an electric discharge machining apparatus. In FIG. 7, the reference numeral 41 denotes a processing tank having a side surface and a bottom surface which are formed of metal sheet; 42, a table which is supported on a bed 44 by a support table 43; and 51, a bellows element which is fixedly mounted on the bottom surface of the table 42 by a screw 53 through a packing 52 in a sealed manner with respect to a processing liquid 50. The bellows element 51 has the other or lower end which is fixedly mounted on the bottom surface of the processing tank 41 by a screw 53 through a packing 54 in a sealed manner with respect to the processing liquid 50. Moreover, the reference numeral 55 denotes a chain which is fixedly mounted on a part of the bottom surface of the processing tank 41; 56, a sprocket which supports the chain 55; 49, a geared motor for driving the chain 55; and 57, springs which are arranged between the upper surface of the bed 44 and the bottom surface of the processing tank 41.

Operation will next be described. In FIG. 7, when the workpiece is fixedly mounted on the upper surface of the table 42, the processing tank 41 is lowered to the lowermost position (refer to a left-hand portion in FIG. 7). The electric discharge liquid 50 is stored within a space defined by the processing tank 41 and the bellows element 51. The pair of packings 52 and 54 are mounted at a mounting section between the bellows element 51 and the processing tank 41 and at a mounting section between the bellows element 51 and the bottom surface of the table 42, respectively, so that an arrangement is formed in which the electric discharge liquid 50 does not escape or leak. Once the workpiece is fixedly mounted on the upper surface of the table 42, the geared motor 49 starts to drive the chain 55. The chain 55 is mounted to a portion of the processing tank 41 through the pair of sprockets 56 and, accordingly, the chain 55 is driven by the geared motor 49 whereby the processing tank 41 is moved upwardly (refer to the right-hand portion in FIG. 7). The springs 57 are attached between the bed 44 and the processing tank 41, to help or assist upward movement of the processing tank 41.

Figure 8:
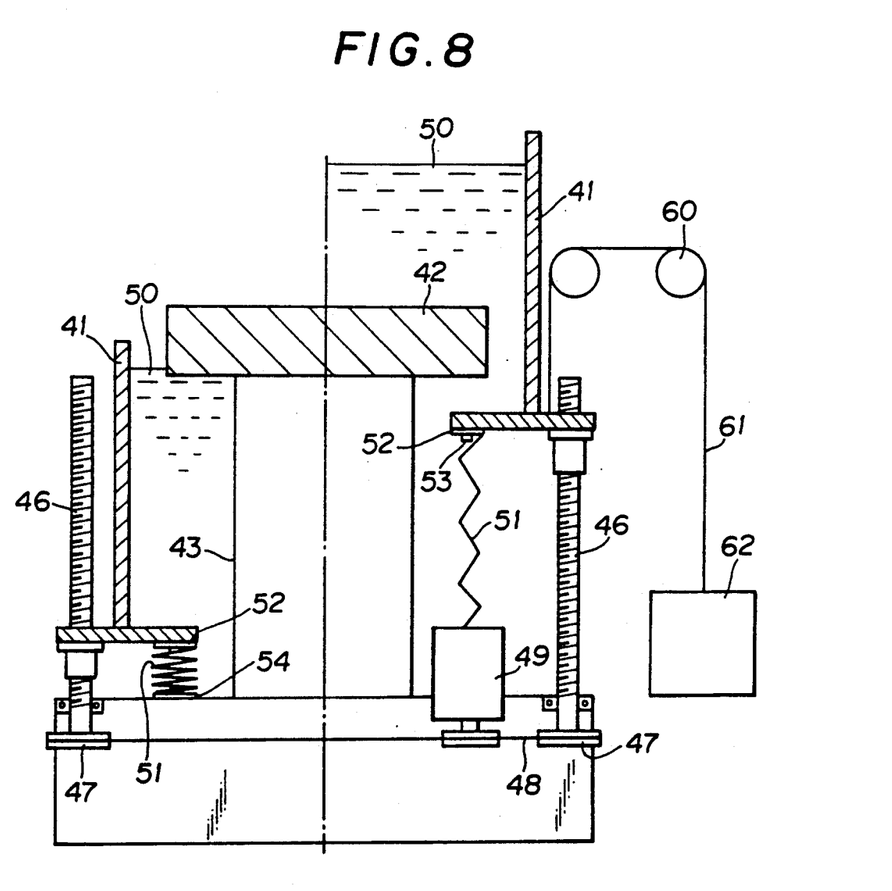
FIG. 8 is a view for explanation showing a modification of the electric discharge machining apparatus illustrated in FIG. 7.

FIG. 8 is a view for explanation showing a modification of the invention illustrated in FIG. 7. The reference numeral 51 denotes a bellows element having an upper and a lower ends which are fixedly mounted to the processing liquid 50 in a sealed manner with respect thereto by screws 53 through packings 52 and 54, respectively; 46, a ball screw having a nut section which is fixedly mounted on a part of the bottom surface of the processing tank 41, and having a lower end to which a sprocket 47 is mounted; 48, a chain; 49, a geared motor for rotating the ball screw 46 through the sprocket 47; 60, a sprocket; 61, a wire; 62, a balance weight. The wire 61 has both ends thereof which are connected to the balance weight 62 and a portion of the processing tank 41, respectively.

As shown in FIG. 8, the electric discharge processing liquid 50 is stored or reserved within a space which is defined by the processing tank 41, the bellows element 51 and the support table 43. Upward movement of the processing tank 41 is similar to that of the conventional machine, but mounting of the ball screw 47 may not be required to be precise or accurate unlike the conventional machine. Under a condition that the processing tank 41 on which the workpiece is mounted is lowered to the lower limit or lowermost position (refer to a left-hand portion in FIG. 8), the chain 48 is driven by the geared motor 49 to rotate the sprocket 47 mounted on the lower end of the ball screw 46, thereby rotating the ball screw 46, so that the processing tank 41 is moved upwardly by the nut of the ball screw 46 which is mounted on the bottom surface of the processing tank 41 (refer to a right-hand portion in FIG. 8). The balance weight 62 is mounted on the processing tank 41 by the wire 61 through the sprocket 60, to assist upward movement of the processing tank 41.

Further, in the above-described embodiments, description has been made as an example of the die-sinking electric discharge machining apparatus as a whole. However, the invention is applicable to various electric discharge machining apparatus such as a wire-cut electric discharge machining apparatus and the like.

Although the invention has been described with respect to various specific embodiments for a complete and clear disclosure, the appended claims are not to be thus limited but are to be construed as embodying all modifications and alternative constructions that may occur to one skilled in the art which fairly fall within the basis teaching herein set forth.

What is claimed is:

1. An electric discharge machining apparatus comprising:
   a vertically movable processing tank for reserving therein a processing liquid, said processing tank being variable in a vertical direction;
   a link mechanism means for vertically moving said processing tank; and
   main processing-tank vertically-moving drive means for driving said link mechanism means and for moving said processing tank vertically and auxiliary drive means operative to move said processing tank and having a retaining force which varies depending upon a position of said movement.

2. An electric discharge machining apparatus according to claim 1, wherein said tank is variable in a vertical direction through an entire stroke and said main drive means is operative to move said tank through said entire stroke.

3. An electric discharge machining apparatus according to claim 2, wherein said auziliary drive means is operative to move said processing tank through said entire stroke.

4. An electric discharge machining apparatus according to claim 2, wherein said auxiliary drive means is operative to move said processing tank through at least part of said stroke.

5. An electric discharge machining apparatus according to claim 1, wherein said processing tank has a plurality of stages superimposed one upon the other in a multiple-stage manner.

6. An electric discharge machining apparatus according to claim 1, wherein said main processing-tank vertically-moving means comprises a hydraulic cylinder.

7. An electric discharge machining apparatus according to claim 1, wherein said main processing-tank vertically-moving means comprises a pneumatic cylinder.

8. An electric discharge machining apparatus according to claim 1, wherein said link mechanism is a two-stage link mechanism.

9. An electric discharge machining apparatus according to claim 1, wherein said link mechanism is a link mechanism structured as a parallelogram.

10. An electric discharge machining apparatus comprising:
   a vertically movable processing tank for reserving therein a processing liquid, said processing tank being variable in a vertical direction;
   a link mechanism used as means for vertically moving said processing tank; and
   processing-tank vertically-moving means having main processing-tank vertically-moving drive means for retaining said processing tank through an entire stoke of said processing tank moving vertically and auxiliary drive means operative only through a portion of the stroke.

11. An electric discharge machining apparatus according to claim 10, wherein said processing tank has a plurality of stages superimposed one upon the other in a multiple-stage manner.

12. An electric discharge machining apparatus according to claim 10, wherein said main processing-tank vertically-moving means comprises a hydraulic cylinder.

13. An electric discharge machining apparatus according to claim 10, wherein said main processing-tank vertically-moving means comprises a pneumatic cylinder.

14. An electric discharge machining apparatus according to claim 10, wherein said auxiliary drive means comprises a hydraulic cylinder.

15. An electric discharge machining apparatus according to claim 10, wherein said auxiliary drive means comprises a pneumatic cylinder.

16. An electric discharge machining apparatus according to claim 10, wherein said link mechanism is a two-stage link mechanism.

17. An electric discharge machining apparatus according to claim 10, wherein said link mechanism is a link mechanism having a parallelogram structure.

18. An electric discharge machining apparatus comprising:
   a table on which a workpiece is mounted;
   a vertically movable processing tank for reserving therein an electric discharge processing liquid; and
   an expandable and contractible cylindrical bellows element;
   wherein said processing tank has a bottom surface which is connected to a bottom surface of said table by said bellows element in a sealed manner with respect to said electric discharge processing liquid.

19. An electric discharge machining apparatus according to claim 18, wherein said bellows element is formed into a cylindrical configuration.

20. An electric discharge machining apparatus according to claim 18, further comprising chain means, wherein vertical movement of said processing tank is executed by driving of said chain means.

21. An electric discharge machining apparatus according to claim 18, further comprising ball screw means, wherein vertical movement of said processing tank is executed by said ball screw means.

22. An electric discharge machining apparatus according to claim 18, further comprising a control element for reducing a drive force during upward movement of said processing tank.

23. An electric discharge machining apparatus according to claim 22, wherein said control element is a spring.

24. An electric discharge machining apparatus according to claim 23, wherein said spring is a tensile spring.

25. An electric discharge machining apparatus according to claim 23, wherein said spring is a compressive spring.

26. An electric discharge machining apparatus according to claim 22, wherein said control element is a balance weight.

27. An electric discharge machining apparatus according to claim 18, further comprising packing means, said bellows element having one end thereof which is fixedly mounted on the bottom surface of said table through said packing means in a sealed manner with respect to said processing liquid.

28. An electric discharge machining apparatus according to claim 27, further including packing means, said bellows element has the other end which is fixedly mounted on the bottom surface of said processing tank through said packing means in a sealed manner with respect to said processing liquid.

29. An electric discharge machining apparatus comprising:
   a table on which a workpiece is mounted;
   a vertically movable processing tank for reserving therein an electric discharge processing liquid;
   a support table by which the first-mentioned table is retained; and
   an expandable and contractible cylinder bellows element;
   wherein said support table has a lower portion which is connected to a bottom surface of said processing tank by said bellows element in a sealed manner with respect to said electric discharge processing liquid.

30. An electric discharge machining apparatus according to claim 29, further including packing means, said bellows element having one end thereof which is fixedly mounted on the lower portion of said support table through said packing means in a sealed manner with respect to said processing liquid.

31. An electric discharge machining apparatus according to claim 30, further including packing means, said bellows element has the other end which is fixedly mounted on the bottom surface of said processing tank through said packing means in a sealed manner with respect to said processing liquid.

32. An electric discharge machining apparatus according to claim 31, wherein said bellows element is formed into a cylindrical configuration.

33. An electric discharge machining apparatus according to claim 29, further comprising chain means, wherein vertical movement of said processing tank is executed by driving of said chain means.

34. An electric discharge machining apparatus according to claim 33, wherein said chain means having one end thereof which is fixedly mounted on a portion of the bottom surface of said processing tank.

35. An electric discharge machining apparatus according to claim 33, further including sprocket means around which said chain means passes in an engaged manner.

36. An electric discharge machining apparatus according to claim 29, further including bed means on which said support table is mounted, and spring means mounted at a location between an upper surface of said bed means and the bottom surface of said processing tank.

37. An electric discharge machining apparatus according to claim 29, wherein said electric discharge processing liquid is stored in a space defined between said processing tank and said bellows element.

38. An electric discharge machining apparatus according to claim 29, further comprising ball screw means, wherein vertical movement of said processing tank is executed by said ball screw means.

39. An electric discharge machining apparatus according to claim 29, further comprising a control element for reducing a drive force during upward movement of said processing tank.

40. An electric discharge machining apparatus according to claim 39, wherein said control element is a spring.

41. An electric discharge machining apparatus according to claim 39, wherein said control element is a balance weight.

42. An electric discharge machining apparatus according to claim 29, further including ball screw means, nut means threadedly engaged with said ball screw means, said nut means being fixedly mounted on a portion of the bottom surface of said processing tank, sprocket means mounted on a lower end of said ball screw means, and chain means passing around said sprocket means in an engaged manner thereto, wherein said ball screw means is rotated by said sprocket means so that said nut means is movable along said ball screw means.

43. An electric discharge machining apparatus according to claim 41, further including sprocket means, wire means extending about said sprocket means, and balance-weight means, wherein said wire means has one end thereof connected to said processing tank and the other end connected to said balance-weight means.

* * * * *